Patented Oct. 27, 1953

2,657,143

UNITED STATES PATENT OFFICE 2,657,143

ADDITION OF FATTY ALCOHOL TO YEAST RAISED BAKERY PRODUCTS

Peter Kass, Wilmington, Del., assignor to Atlas Powder Company, Wilmington, Del., a corporation of Delaware No Drawing. Application August 2, 1949,
Serial No. 108,232

4 Claims. (Cl. 99—91)

This invention relates to yeast-raised flour-containing bakery products such as bread, rolls, sweet doughs and the like and to processes for making such products.

A problem of grave concern in the baking industry is the tendency of yeast raised baked goods including bread, dinner rolls, sweet rolls, and the like, to undergo changes in physical properties after the products are baked and cooled, principal among which is a gradual hardening of the crumb, resulting in a firmer product which is characterized as stale. Although it has been established that staling is not due to loss of water from the baked product, the exact nature of the changes within the loaf which bring about the characteristic increase in firmness is not understood. It is thought that some change in the relationship between the starch of the flour and the bound water of the product occurs during ageing but the exact mechanism has not been explained.

It is an object of the present invention to provide a yeast-raised baked product of improved crumb softness.

It is a further object to provide yeast-raised baked products in which the rate of hardening of the crumb on ageing is reduced.

Other objects of the invention will become apparent from the following description and the appended claims.

The above objects are accomplished by incorporating in the dough of the bread or other yeast-raised bakery product, before baking, a higher aliphatic alcohol.

The aliphatic alcohols suitable for inclusion in the process and product of the present invention comprise straight chain, unsubstituted monohydric alcohols containing from 12 to 22 carbon atoms per mol, and no oxygen other than that of the hydroxyl radical. The said alcohols may be saturated or unsaturated although it is preferred to employ those containing not more than two carbon-to-carbon double bonds per mol. Specific alcohols so defined include, among others, lauryl, myristyl, cetyl, stearyl, eicosyl, docosyl, oleyl, isooleyl, linoleyl, and erucyl alcohols. Of these, the preferred members are those containing from 12 to 18 carbon atoms per mol and not more than one carbon-to-carbon double bond. It will be understood that where reference is made to an alcohol within the limits of the above definitions, mixtures of such alcohols are equally intended whether such mixtures be synthetically compounded from pure individual alcohols or the mixed alcohols obtained by the reduction of the fatty acids or the alkyl esters of fatty acids from natural fats and oils.

The amount of said alcohol which may be incorporated in practicing the present invention may be varied over a considerable range depending upon the types of bakery products to which the invention is applied and the extent of softening action desired. In general, however, as little as about 0.05% based on the flour of the alcohol will produce significant improvement in the baked goods and in extreme cases it may be desirable to utilize as much as 5.0% of the said alcohol. Preferred products are obtained by employing from about 0.3% to about 1.5% of the aliphatic alcohol based on the flour.

The crumb-softening aliphatic alcohol may be incorporated at any convenient step in the processing of the dough prior to the baking. For example, the harder alcohols may be melted and incorporated in the shortening and added with the latter ingredient. The liquid or pasty alcohols may be added as a separate ingredient and thoroughly mixed with the flour as the dough is being prepared. The invention is not limited to any particular method of introducing the softening agent.

Specific examples illustrative of the practice of the present invention are presented in the following:

EXAMPLE I

*Sweet yeast-raised coffee cake*

This example illustrates the invention as applied to the production of sweet yeast-raised dough for coffee cake, tea rings and the like.

FORMULA

| | |
|---|---|
| Bread flour | 75 lbs |
| Pastry flour | 25 lbs. |
| Milk | 47 lbs. |
| Yeast | 6 lbs. |
| Sugar | 12 lbs. |
| Malt syrup | 3 lbs. |
| Salt | 2 lbs. |
| Hydrogenated vegetable oil | 15 lbs. |
| Eggs | 9 lbs. |
| Flavoring | to taste. |
| Oleyl alcohol | 1 lb. |

PROCEDURE

Cream the malt, sugar, salt and shortening. Add the eggs gradually and cream until light. Add the flavoring and oleyl alcohol. Dissolve the yeast in a quarter of the milk. Place the balance of the milk in the bowl with the creamed mass and stir well to dissolve the ingredients.

Add the bread flour and start mixing. Pour in the yeast solution, add the pastry flour and continue mixing until smooth. Have the dough at 80° F. when mixed. Allow dough to rise to full punch, then take to bench in 15 minutes. Scale, make up into desired shapes, proof to double their size and bake.

EXAMPLE II

*White Bread by Straight Dough Method*

FORMULA

| | |
|---|---|
| Bread flour | 3¼ cups |
| Hot water | 1 cup |
| Sugar | 1 tblsp. |
| Salt | 1 tsp. |
| Shortening | 2 tsp. |
| Lauryl alcohol | 1 tsp. |
| Compressed yeast | ½ cake |

PROCEDURE

The ingredients were well mixed, the yeast being dispersed in 2 tablespoons of warm water before addition. The dough was raised, proofed and baked in the usual manner.

The crumb of the resulting loaf was unusually soft compared with a control loaf made over a similar formula with the exception that the lauryl alcohol was replaced by shortening, and this crumb softness persisted over a week's storage.

Cetyl alcohol may be substituted for lauryl alcohol in the above formula by melting the alcohol and shortening together before adding them to the other ingredients.

EXAMPLE III

*White bread by sponge dough method*

FORMULA

| Sponge | Dough |
|---|---|
| 60 lbs. bread flour<br>36 lbs. water<br>3 lbs. yeast<br>¼ lb. yeast food | 40 lbs. wheat flour<br>25 lbs. water<br>2.2 lbs. salt<br>5 lbs. sugar<br>4 lbs. non-fat milk solids<br>3 lbs. hydrogenated vegetable oil.<br>½ lb. myristyl alcohol |

PROCEDURE

*Sponge.*—Dissolve the yeast in a portion of the water (72° F.) and add to mixer along with flour, yeast food and the balance of the water. Mix just enough to make a homogeneous mass, dump into a trough and ferment for 5½ hours at 72° F.

*Dough.*—Return fermented sponge to mixer, add all the dough ingredients, including the myristyl alcohol, and mix until smooth. Allow to stand again, mold, pan, proof at 95° F. to top of pans and bake at 420° F. until uniformly brown, about 30 minutes with steam in oven. Cool slowly to room temperature and wrap in moisture-proof paper.

The examples presented herein are illustrative only and many modifications of the techniques disclosed therein will readily suggest themselves to those skilled in the baking art. The scope of the invention is defined in the following claims.

I claim:

1. In the preparation of yeast-raised, flour-containing bakery products, the improvement which comprises incorporating into the dough from about 0.05 to about 5.0% by weight based on the weight of flour, of a straight chain unsubstituted monohydric aliphatic alcohol containing from 12 to 22 carbon atoms per mol and containing no oxygen other than that of the hydroxyl radical.

2. In the preparation of yeast-raised, flour-containing bakery products, the improvement which comprises incorporating into the dough from about 0.3 to about 1.5% by weight based on the weight of flour, of a straight chain unsubstituted monohydric aliphatic alcohol containing from 12 to 22 carbon atoms per mol and containing no oxygen other than that of the hydroxyl radical.

3. In the preparation of yeast-raised, flour-containing bakery products, the improvement which comprises incorporating into the dough from about 0.3 to about 1.5% by weight, based on the weight of flour, of a straight chain unsubstituted monohydric aliphatic alcohol containing from 12 to 18 carbon atoms and not more than one carbon-to-carbon double bond per mol, and containing no oxygen other than that of the hydroxyl radical.

4. The process of claim 3 wherein the alcohol is lauryl alcohol.

PETER KASS.

References Cited in the file of this patent

UNITED STATES PATENTS

| Number | Name | Date |
|---|---|---|
| 1,475,574 | Gesell | Nov. 27, 1923 |
| 2,132,700 | Richardson | Oct. 11, 1938 |
| 2,176,077 | Katzman | Oct. 17, 1939 |
| 2,183,516 | Mink | Dec. 12, 1939 |
| 2,350,082 | Taussky | May 30, 1944 |
| 2,508,393 | Jaeger | May 23, 1950 |
| 2,509,926 | Johnson | May 30, 1950 |

OTHER REFERENCES

Lowe, Experimental Cookery, John Wiley and Sons, Inc., 2d ed., 1937, pages 436–438.

Bakers Digest, April 1949, pages 67–70.

Chem. Abst. 41: 7014(h) Belgian Patent 450.829.